US006880804B1

(12) United States Patent
Biggers

(10) Patent No.: US 6,880,804 B1
(45) Date of Patent: Apr. 19, 2005

(54) VALVE SEALING MEANS

(76) Inventor: John Caleb Wells Biggers, Yandina Caravan Park, Bruce Highway, Yandina, QLD 4561 (AU)

( * ) Notice: Subject to any disclaimer, the term of this patent is extended or adjusted under 35 U.S.C. 154(b) by 106 days.

(21) Appl. No.: 10/110,501

(22) PCT Filed: Oct. 13, 2000

(86) PCT No.: PCT/AU00/01241

§ 371 (c)(1),
(2), (4) Date: Aug. 5, 2002

(87) PCT Pub. No.: WO01/29458

PCT Pub. Date: Apr. 26, 2001

(30) Foreign Application Priority Data

Oct. 15, 1999 (AU) .................................. PQ3476

(51) Int. Cl.[7] .................................................. F16K 1/14

(52) U.S. Cl. ................ 251/278; 137/329.01; 137/636.3

(58) Field of Search ................................ 251/264, 277, 251/278, 313; 137/625.4, 636.3, 901, 607, 137/269, 329.01

(56) References Cited

U.S. PATENT DOCUMENTS

| | | | | |
|---|---|---|---|---|
| 971,646 | A | * | 10/1910 | Tuerk et al. ................. 251/321 |
| 1,336,026 | A | * | 4/1920 | Dempsey ..................... 251/270 |
| 3,001,541 | A | * | 9/1961 | St Clair ....................... 137/113 |
| 4,181,987 | A | | 1/1980 | Kesselman |
| 4,666,124 | A | | 5/1987 | Giacobbi |
| 5,005,805 | A | | 4/1991 | Morris et al. |
| 5,407,173 | A | * | 4/1995 | Smith ............................ 251/86 |
| 5,586,748 | A | * | 12/1996 | Kish ........................ 251/149.8 |

FOREIGN PATENT DOCUMENTS

| | | | |
|---|---|---|---|
| AU | WO 95/00789 | * | 1/1995 |
| GB | 2 206 671 A | | 1/1989 |
| GB | 2 260 183 A | | 4/1993 |
| GB | 2 269 000 A | | 1/1994 |

* cited by examiner

Primary Examiner—Edward K. Look
Assistant Examiner—John K. Fristoe, Jr.
(74) Attorney, Agent, or Firm—Renner, Otto, Boisselle & Sklar, LLP

(57) ABSTRACT

A retrofit valve for primarily for use in conventional domestic, agricultural and commercial water taps. The valve has a seat (10) located in a passageway between a water inlet (11) and a water outlet (12). A spherical sealing member (13) is arranged to seal against the fluid inlet side of the seat, and a plunger (12) is provided for moving the sealing member off the seat.

17 Claims, 5 Drawing Sheets

VALVE SEALING MEANS

BACKGROUND OF THE INVENTION

This invention relates to valves and is particularly concerned with valves for use in conventional domestic, agricultural and commercial water taps. Accordingly, the invention will primarily be described in these contexts although it will be readily apparent to the skilled addressee that the invention has broader ramifications and may be readily modified to suit other applications. The following description is therefore not to be deemed limiting on the scope of the invention.

DESCRIPTION OF THE PRIOR ART

Common domestic water taps comprise a tap body having a fluid flow pathway extending therethrough, a valve seat located intermediate the fluid flow pathway, a tap spindle moveable towards and away from the valve seat which includes an axial recess, and a tap head which connects to the tap body and which houses the tap spindle. The tap head includes an opening in the top through which an upper portion of the tap spindle extends and on which a handle is fitted to permit the tap spindle to be rotated in the tap head and thereby move either towards or away from the valve seat.

Valves which are commonly used with this type of tap are known as tap washers or jumper valves and comprise a disc-like seal which overlies the valve seat, and a stem which extends from the disc-like seal and locates within the tap spindle. Thus, movement of the tap spindle towards the valve seat causes the disc-like seal to be brought into engagement with the valve seat to thereby stop the flow of water through the tap body.

Such disc-like seals have a number of disadvantages, prime among which are their proclivity to rapid wear, leading to a relatively limited life span. Also, it is quite common for particulate debris to be trapped on the disc so that a firm seating cannot be achieved and dripping occurs. In addition, there must be absolute tolerance between the valve seat and the valve seal otherwise it is necessary to exert significant turning pressure on the tap handle to ensure that the seal is properly sealed. This can lead to cracking of the valve seat.

One method of solving the problem of valve wear and the problem of debris entrapment is the subject of Australian Patent No. 630040. In that patent there is described a valve assembly which includes a resiliently deformable spherical sealing member on the downstream side of the valve seat. The sealing member is retained within the valve body by means of a helical spring which surrounds the spherical sealing member.

A slight drawback in the valve design described in the aforementioned Australian Patent is that in order to turn the tap off, the tap spindle must be tightly wound down to ensure that the spherical sealing member is firmly pressed against its seat. Since the sealing member is moving against the flow of fluid, this can require quite a few complete revolutions of the tap handle before the flow ceases completely.

OBJECTS OF THE INVENTION

It is therefore an object of the invention to provide an alternative valve construction which has the advantages of the aforementioned valve but addresses the drawback associated with turning the valve off, that is, by providing a simpler action requiring less turning of the valve handle.

A further object of the invention is to provide a retrofit valve which is adapted for use in conventional tap systems.

SUMMARY OF THE INVENTION

According to one aspect of the present invention there is provided a valve having a seat located in a passageway between a fluid inlet and a fluid outlet, a sealing member adapted to seal against the fluid inlet side of the seat, and a plunger for moving the sealing member off the seat.

The design of the valve is such that the pressure of the fluid is used to form the seal, thereby enabling a quick seal to be achieved. Furthermore, when the valve is incorporated into a tap body, the tap handle on the end of the plunger need only be rotated by between about one quarter and one half a turn to fully unseat the sealing member to enable full fluid flow through the valve. Also, it is impossible to damage the valve seat when closing the valve as the pressure of the fluid which enables this closure is considerably less than the force exerted by a person in winding a conventional valve shut.

The design of the valve is also such that it can be readily retrofit into an existing tap system.

DETAILED DESCRIPTION OF THE INVENTION

The sealing member preferably has a spherical configuration although other shapes are not excluded. The sealing member can be formed from a resilient material but is preferably of solid, rigid construction. Such materials of construction include stainless steel and brass, as well as natural and synthetic rubbers with appropriate additives, plastics materials, composites of these materials, and the like. It can, furthermore, be of solid or hollow construction.

It can be desirable, but not essential, that the sealing member and the inlet side of the valve seat are of complementary shape in the region where they abut one another, so as to guarantee a liquid-tight seal between the sealing member and the inlet side of the valve seat when the sealing member is in its closed position. For example, with the preferred spherical sealing member, the inlet side of the valve seat can be provided with a slightly concavely curved sealing surface extending around the flow aperture. However, as noted, this is not essential and it is typically sufficient in the majority of cases to provide a resilient seal of fabric or plastics material for the sealing member to locate onto. This will generally provide adequate sealing in the valve body.

Biasing means are preferably included in the valve design to bias the sealing member against the seat and to guide the sealing member to its sealing location. Such biasing means can comprise a spring, such as a helical compression spring, located on the fluid inlet side of the seat. The biasing means will suitably be fabricated from non-toxic, non-corrosive materials such as stainless-steel and plastics materials.

The plunger suitably extends through the valve seat from the fluid outlet side of the passageway and can be retained by, or formed integrally with, a rotatable spindle of an associated tap handle. Preferably the plunger is formed integrally with the spindle and has a reduced cylindrical configuration at the end which acts against the sealing member to unseat it and open the valve.

Another aspect of the present invention is a tap incorporating a valve as described above. The tap can be of a conventional domestic water tap or a single handle hot and cold mixing tap incorporating two of the aforementioned valve arrangements.

The tap design is such that it only takes between about ¼ and ½ a rotation of the handle to turn it fully on. Also since the action of turning on is against the flow of water and the reverse action of turning off is with the flow of water, overtightening of the tap is avoided and it is therefore essentially damage-proof. Turning off, in fact, conveys a very soft feel as such an action is assisted by the flow of water and the biasing means.

The fact that sealing is effected by means of a spherically sealing member such as a stainless steel ball or the like, means that there is very little wear at the point of sealing and the sealing member can be expected to last the life of the tap.

DESCRIPTION OF PREFERRED EMBODIMENT

Figure 1:
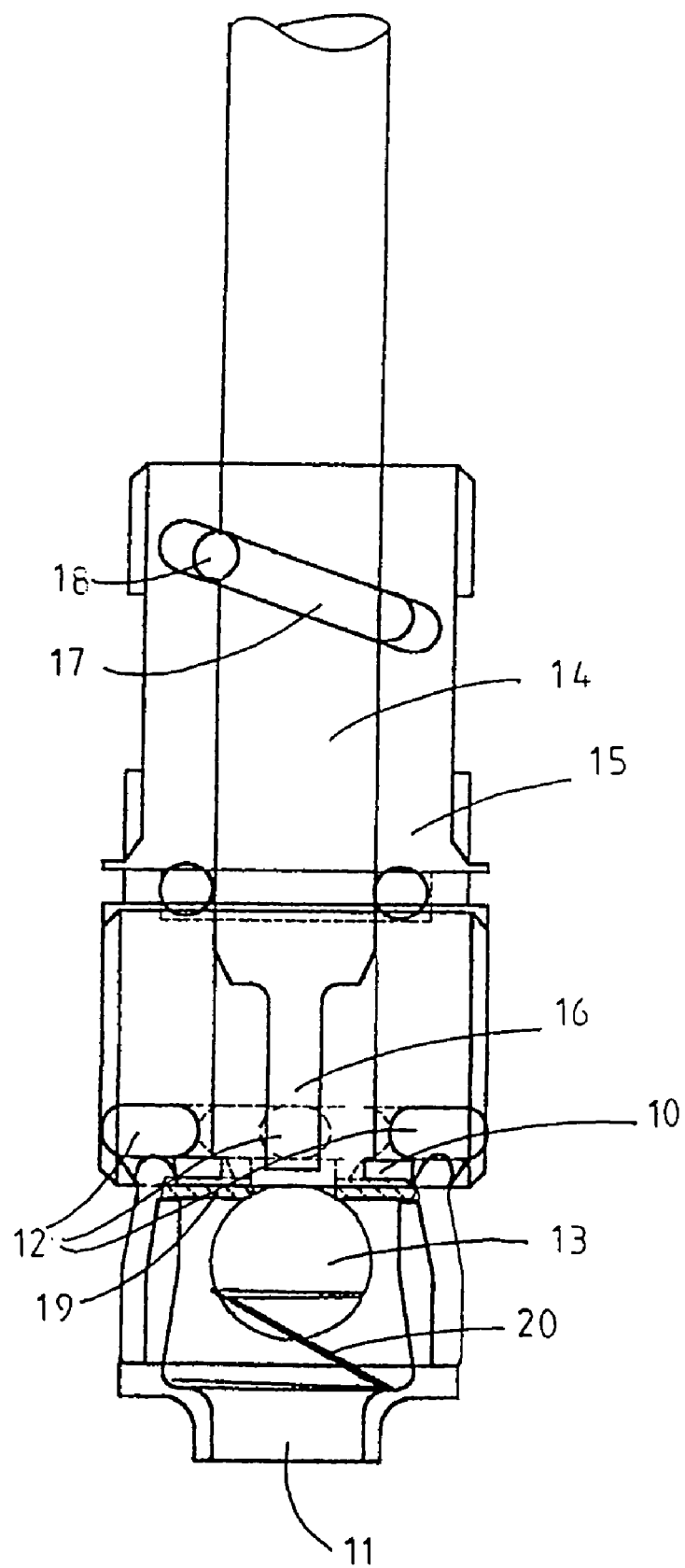
FIG. 1 is a cross-sectional view of a valve according to the present invention.

Preferred embodiments of the invention will now be described with reference to the accompanying drawings, in which like reference numerals refer to like parts.

Referring firstly to FIG. 1, the valve has a seat 10 located in a passageway between a fluid inlet 11 and a fluid outlet 12.

A stainless steel spherical sealing member 13 is located on the inlet side of the seat 10.

A cylindrical plunger 14 is located for axial movement in a housing 15, to move the sealing element from the seat. The plunger 14 has a tapered end 16 so that it can extend through an opening in the seat 10 without significantly impeding the flow of fluid past the seat as hereinafter described. A helical groove 17 in the housing 15 accommodates a detent 18 on the plunger 14, and regulates the axial movement of the plunger as it is rotated.

The sealing element 13 is guided to its seating position by a helical spring 20 and by virtue of the pressure of the fluid at the inlet side of the seat, as described below.

Figure 2:
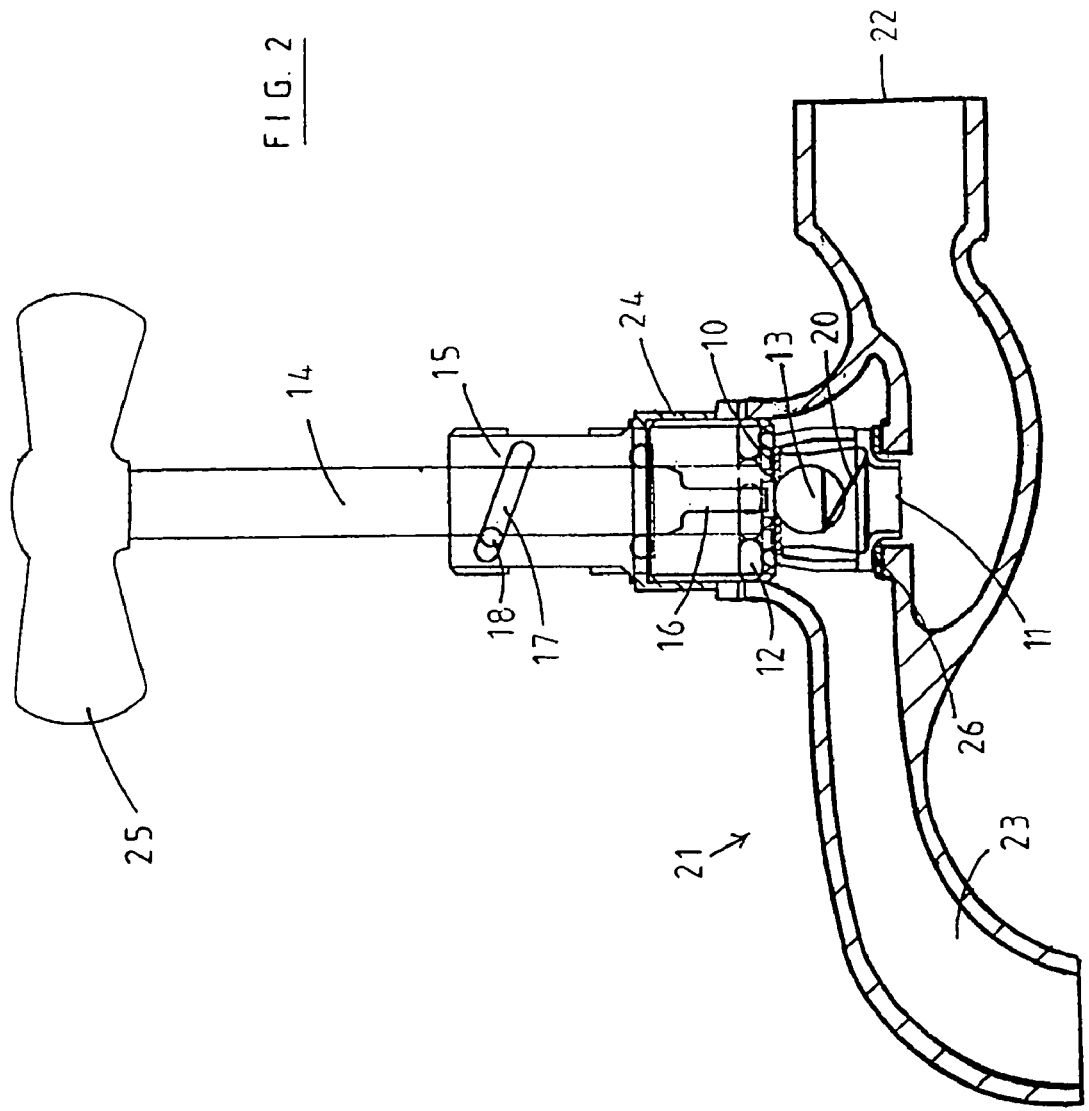
FIG. 2 is a cross-sectional view of the valve of FIG. 1 in a tap body.

Reference is now made to FIG. 2 which shows the previously described valve fitted to a tap body 21. The tap body can either be a body specifically made for the valve or it can be the tap body of a conventional tap which has had its original valve seating system removed.

The tap body 21 is connected to a pressurised fluid supply at 22 and has an outlet passageway at 23.

The valve is fitted to the tap body and secured thereto by a collar 24 which is held by the housing 15 and which screws into the tap body. A washer 26 seals the bottom region of the valve to the tap body.

Figure 3:
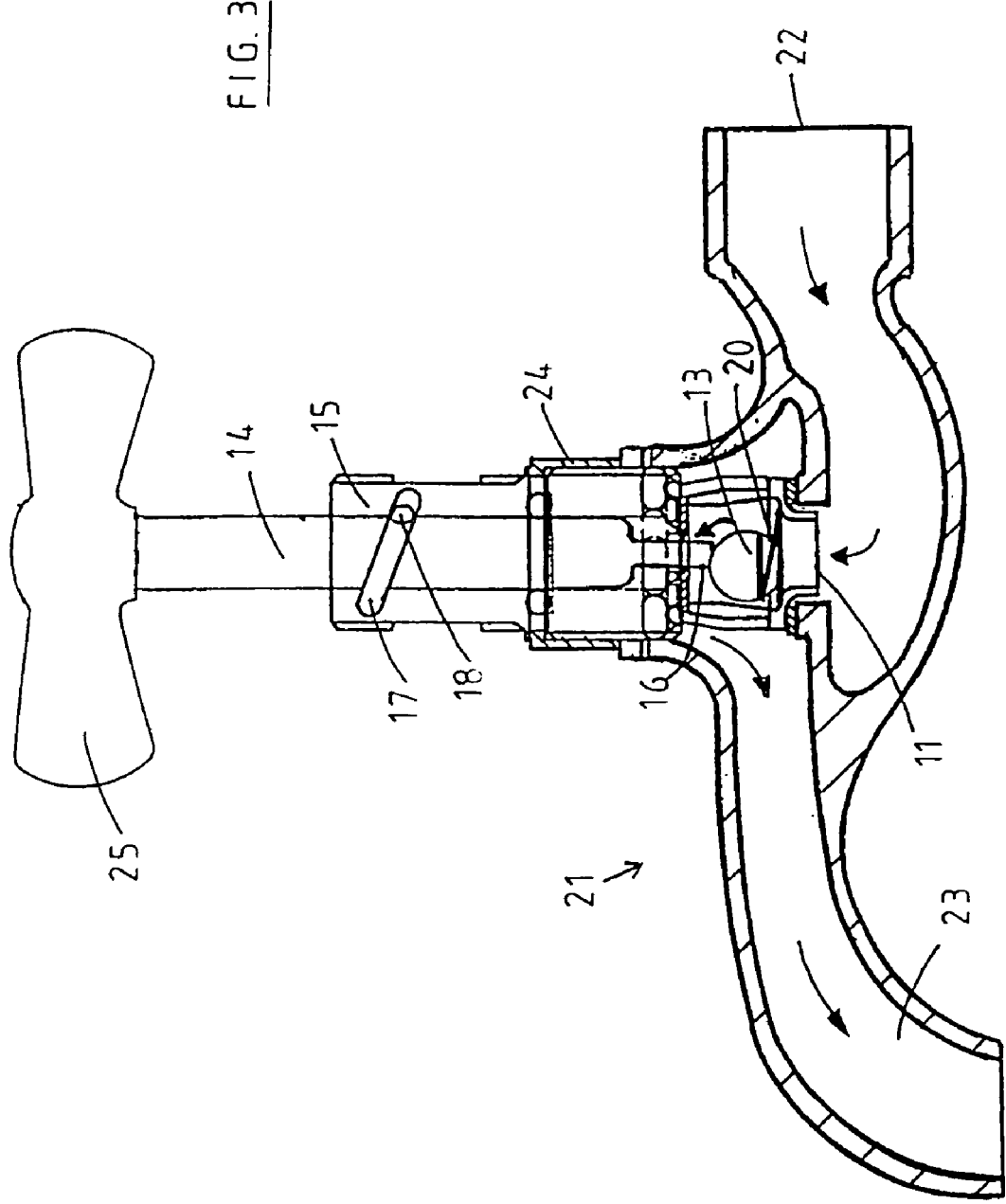
FIG. 3 is a cross-sectional view similar to FIG. 2 but wherein the valve is open.

FIG. 3 shows the sealing member 13 displaced from its seat by the plunger 14 and the flow of fluid through the tap and valve indicated by heavy arrows.

In use, fluid flow through the tap is prevented, as shown in FIG. 2, by the stainless steel spherical sealing element 13 seating against the seat 10 due to the pressure of the fluid on the inlet side of the valve. That is, the pressure of the fluid is used to advantage to provide the seal. Additionally, sealing can be provided by the helical spring 20 should the pressure in the system at the inlet happen to fall below that which would otherwise enable self-sealing to occur.

Rotation of the tap handle 25 by between only about one quarter to one third of a full rotation is sufficient to wind the cylindrical plunger 14 downwardly by an amount which fully unseats the sealing element 13 from the seat 10 so that it is displaced to the location shown in FIG. 3. It will be observed that the sealing element is fully depressed into a bottom corner of the chamber in which it is located, this also being enabled by the helical spring 20 which, upon compression, acts as a guide for the sealing element to this position.

In this unseated position, fluid is free to flow through the tap in the direction shown by the arrows.

In order to turn the tap off, the handle 25 is rotated in the opposing (ie. clockwise) direction to that when it was turned on, allowing the sealing element 13 to rise under the pressure of fluid at the fluid inlet, and to be guided by the helical spring to seal against the seat 10. Alternatively, closing could be effected automatically once the turning force on the tap handle 25 is removed. To this end, for instance, a heavier helical spring could be used instead of the normal spring 20.

Figure 4:
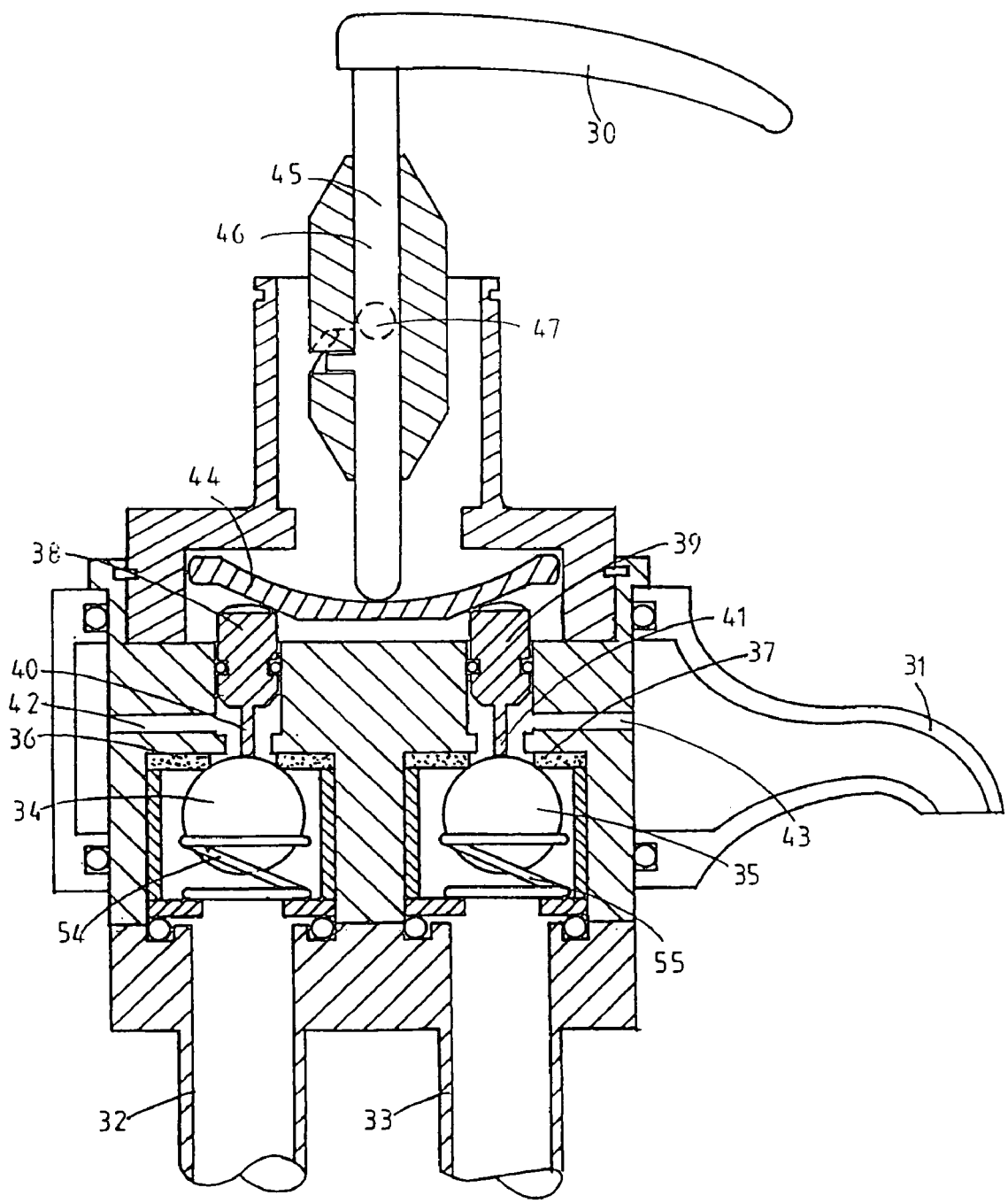
FIG. 4 is a cross-sectional view of a hot and cold mixer tap incorporating two valves according to the present invention.
Figure 5:
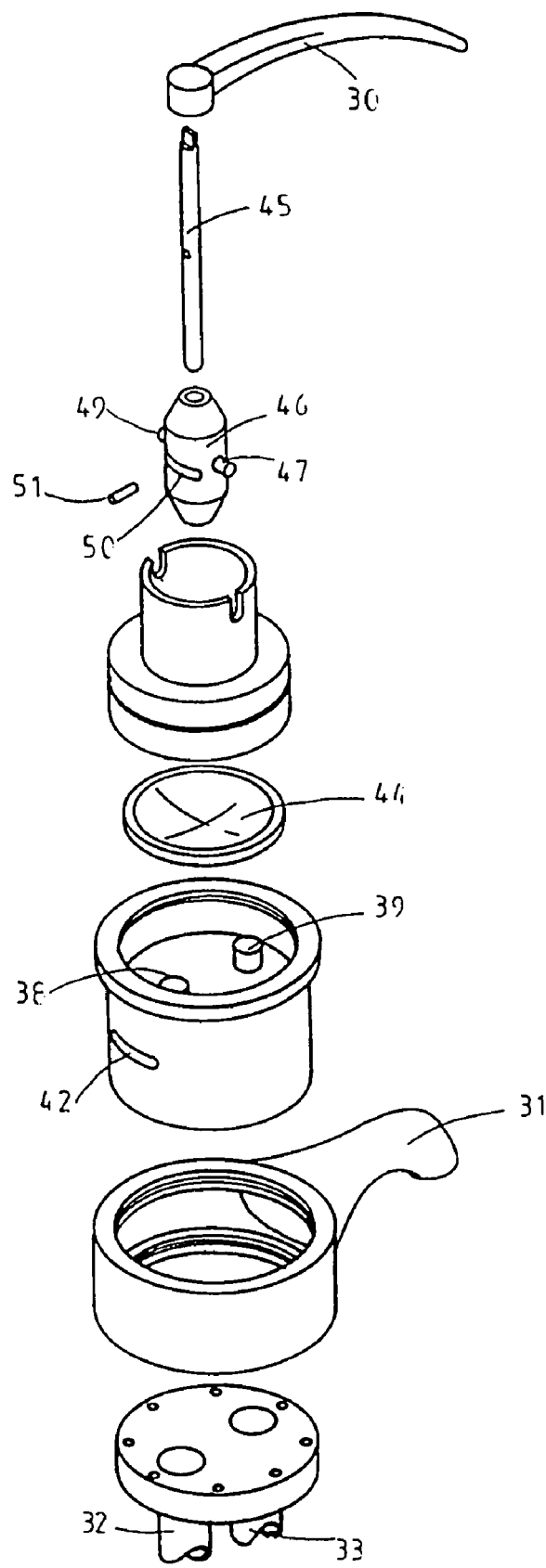
FIG. 5 is an exploded perspective view of the mixer tap of FIG. 4.

Reference is now made to FIGS. 4 and 5 which illustrate a multi-valve arrangement incorporated into a hot and cold mixer tap.

The mixer tap includes a fixed housing having a handle 30, a rotatable spout 31, and hot and cold water inlets 32, 33. Each water inlet 32, 33 has an associated valve arrangement consisting of a stainless steel ball 34 (35) surmounted on a helical spring 54 (55), a seat 36 (37) and a plunger 38 (39) with a tapered end 40 (41) which can extend through an opening in the seat. A plurality of channel outlets, e.g. 42, 43 are formed in the mixer tap casting which connect to the rotatable spout 31.

The upper ends of the respective plungers 38, 39 freely contact a floating plate 44 which is acted upon by a shaft 45 extending through a swivel control 46. The swivel control has lugs 47, 49 which support the control in the upper portion of the housing in such a manner that it can pivot from side to side. A sloping slot 50 is formed in the wall of the swivel control for accommodating a pin 51, which is connected to the shaft 45, to regulate the axial movement of the shaft 45 when it is rotated by handle 30 in a manner analogous to that described in the earlier embodiment.

In operation, fluid flow through the mixer is prevented by the stainless steel balls 34, 35 seating against their respective seats 36, 37, due to the pressure of the fluid on the inlet sides of the valves.

Rotation of the handle 30 by between about one quarter to one third of a full, rotation is sufficient to drive the shaft 45 fully downward, guided by the slot 50, and depress the floating plate 44 against the top ends of the plungers 38, 39. This, in turn, depresses the plungers so that their respective tapered ends pass through the valve seat openings and displace the stainless steel balls 34, 35 from their seats, thereby enabling hot and cold water to flow in equal amounts through the valve housings, into the channel outlets, e.g. 42, 43 and out through the spout 31.

In order to regulate the relative flows of hot and cold water, the handle 30 is rocked toward the hot or cold water inlet side so that the swivel control 46 pivots on its lugs 47, 49 and directs the end of the shaft 45 to one of the sides of the floating plate 44. The floating plate then tilts and depresses either plunger 38 or 39 to a greater or lesser extent than the other. This results in the relative displacement of the stainless steel balls in their respective housings, being different so that the relative flow of hot and cold water is changed.

Halting the flow of water through the mixer can be by counter-rotation of the handle manually, or automatically as described in the previous embodiment.

What is claimed is:

1. A valve comprising:
   a seat located in a passageway between a fluid inlet and a fluid outlet;
   a spherical sealing member adapted to seal against the fluid inlet side of the seat; and
   a plunger for moving the sealing member off the seat, said plunger being reciprocally moveable by rotation such that between about one quarter and one half a turn is required to fully unseat the spherical sealing member and thereby enable full fluid flow through the valve;
   wherein the plunger is adapted to project through the seat from the outlet side of the seat and includes a cylindrical configuration with a tapered end portion which can project through the seat when the plunger is rotated about its axis; and
   wherein the plunger is arranged for longitudinal movement within a housing, said plunger including a detent which slots into a groove formed in the wall of the housing to regulate the longitudinal movement of the plunger when it is rotated.

2. A valve comprising:
   a housing;
   a seat located in a passageway between a fluid inlet and a fluid outlet;
   a sealing member adapted to seal against a fluid inlet side of the seat;
   a plunger for moving the sealing member off the seat, the plunger being arranged for reciprocal movement within the housing;
   wherein the valve further includes a projection that engages with a groove whereby rotation of a tap handle causes movement of the projection in the groove to thereby longitudinally move the plunger whereby between about one-quarter and one-half of a turn is required to fully unseat the sealing member and thereby enable full fluid flow through the valve.

3. A valve as claimed in claim 2 wherein the groove is formed in a wall of the housing and the projection is formed on the plunger such that rotation of the tap handle causes rotation of the plunger and the projection moves in the groove to cause longitudinal movement of the plunger.

4. A valve as claimed in claim 3 wherein the groove is a helical groove.

5. A valve as claim in claim 2 wherein the sealing member is biased against the seat by mechanical biasing means as well as by pressure of fluid at the fluid inlet.

6. A valve as claimed in claim 5 wherein the mechanical biasing means is a spring located on the fluid inlet side of the seat.

7. A valve as claimed in claim 2 wherein the sealing member is a spherical sealing member.

8. A valve as claimed in claim 2 wherein the plunger is adapted to project through the seat from the outlet side of the seat.

9. A valve as claimed in claim 8 wherein the plunger has a cylindrical configuration with a tapered end portion which can project through the seat.

10. A valve for retrofitting to a tap body, the tap body including an inlet, an outlet, a tap body valve seat located in a tap body flow passageway extending between the inlet and the outlet and an opening for receiving a prior fitted valve in which a valve seal member forms a seal with the tap body valve seat to halt fluid flow through the tap body, the valve comprising:
    a valve housing connectable to the tap body in a fluid tight manner, the valve housing having a fluid passageway between a fluid inlet and a fluid outlet;
    a valve housing seat formed in the fluid passageway;
    a sealing member adapted to seal against a fluid inlet side of the valve housing seat and an actuating mechanism to move the sealing member off the valve housing seat; and
    wherein fluid flow is controlled by operating the actuating mechanism to move the sealing member away from the valve housing seat to allow fluid to flow and operating the actuating member to cause the sealing member to seal against the fluid inlet side of the valve housing seat;
    whereby when the valve is connected to the tap body in a fluid tight manner, fluid flows into the inlet of the tap body and then through the fluid inlet and then through the fluid outlet and then exits the outlet of the tap body when fluid is flowing through the valve; and
    wherein the actuating mechanism includes a plunger for moving the sealing member off the valve housing seat, the plunger being arranged for reciprocal movement within the housing, the valve further including a projection that engages with a groove whereby rotation of a tap handle causes movement of the projection in the groove to thereby longitudinally move the plunger, whereby between about one-quarter and one-half of a turn is required to fully unseat the sealing member and thereby enable full fluid flow through the valve.

11. A valve as claimed in claim 10 wherein the groove is formed in a wall of the wall housing and the projection is formed on the plunger such that rotation of the tap handle causes rotation of the plunger and the projection moves in the groove to cause longitudinal movement of the plunger.

12. A valve as claimed in claim 11 wherein the groove is a helical groove.

13. A valve as claimed in claim 11 wherein the plunger is adopted to project through the seat from the fluid outlet side of the seat.

14. A valve as claimed in claim 13 wherein the plunger has a cylindrical configuration with a tapered portion which can project through the seat.

15. A valve as claimed in claim 10 wherein the sealing member is biased against the valve housing seat by a mechanical biasing means as well as pressure of the fluid at the fluid inlet.

16. A valve as claimed in claim 15 wherein the mechanical biasing means is a spring located on the fluid inlet side of the seat.

17. A valve as claimed in claim 10 wherein the sealing member is a spherical seating member.

* * * * *